Jan. 10, 1956   F. B. SAMUEL   2,730,242
APPARATUS FOR SEPARATING OIL FROM WAX
Filed Feb. 27, 1951   3 Sheets-Sheet 1
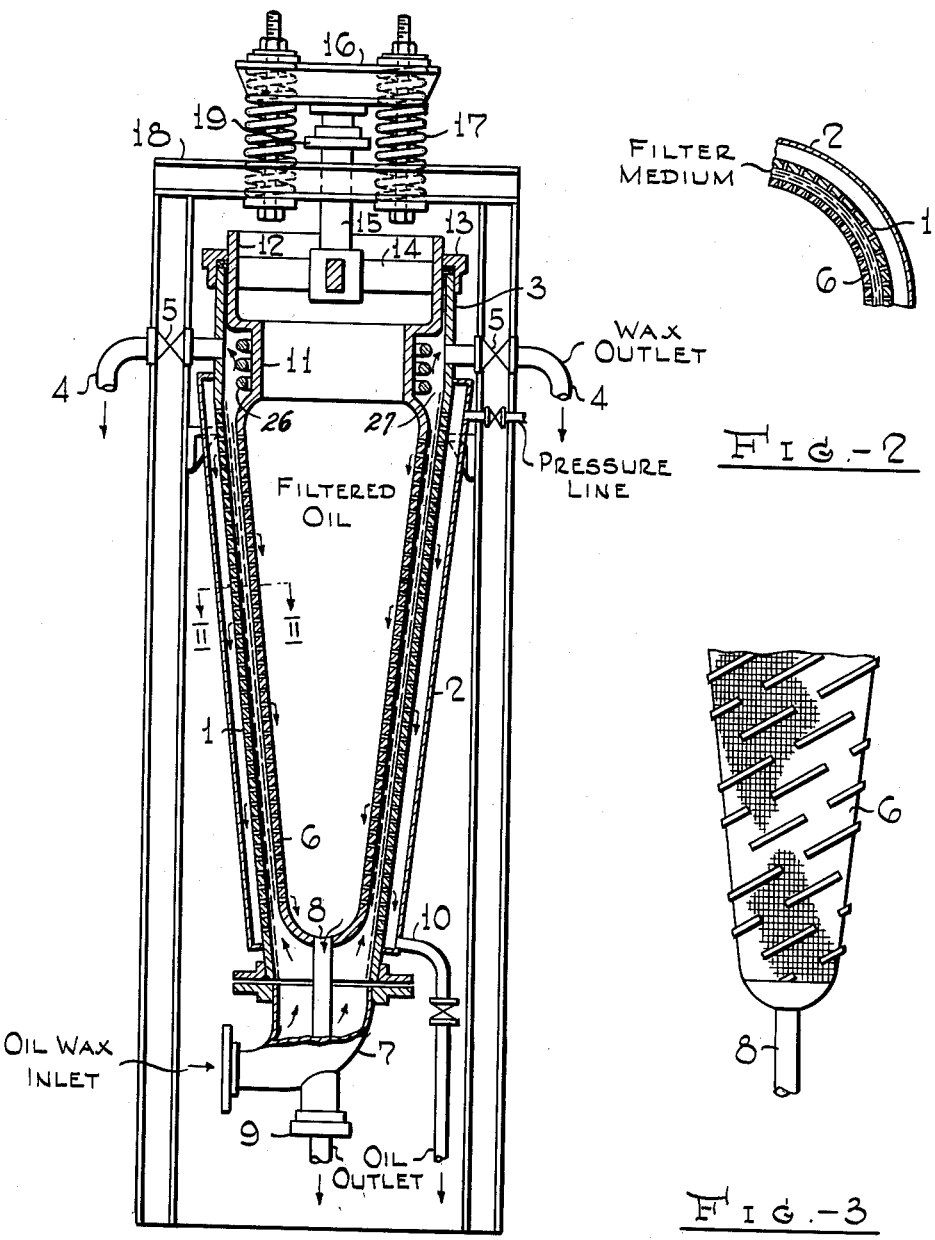
Frank B. Samuel   Inventor
By J C Amall   Attorney

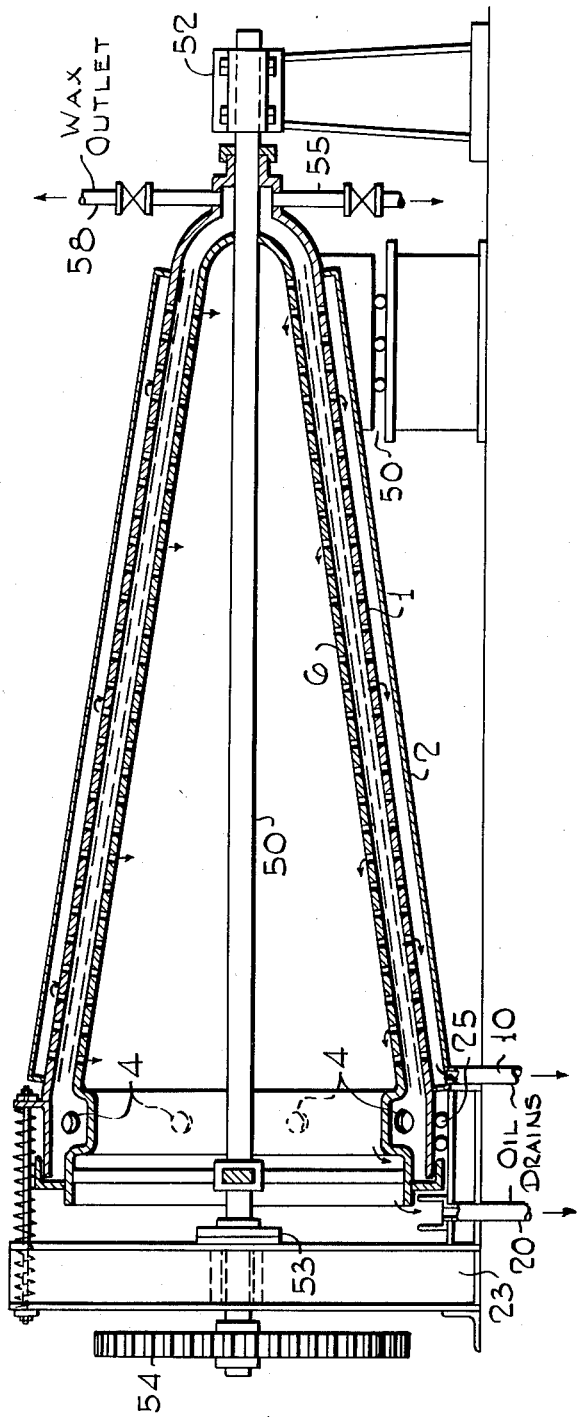

ated Jan. 10, 1956

2,730,242

APPARATUS FOR SEPARATING OIL FROM WAX

Frank Burnette Samuel, Baton Rouge, La., assignor to Esso Research and Engineering Company, a corporation of Delaware Application February 27, 1951, Serial No. 212,875

4 Claims. (Cl. 210—199)

This invention relates to a process and apparatus for removing oily constituents from wax.

As is well known, slack wax is the cake wax resulting from filtering, usually in a Moore press, of the paraffin distillate taken in the preliminary distillation of crude oil following the chilling thereof to solidify or crystallize its wax content. To remove the oil content of the slack wax and thus regain the wax content thereof, the slack wax is treated according to the conventional sweating practice for the purpose of sweating out the oil or the various fractions thereof. While it is recognized that batch sweating is a laborious and time-consuming operation requiring extensive plant space, the practice has persisted despite its numerous shortcomings, chiefly because of the impracticability of the various mechanical methods advanced to replace it and the high cost of non-mechanical methods such as refining by solvents.

The present invention is directed to a pressure filter and a method of filtering which has special application to the recovery of wax from slack wax, but which is also adaptable to filter out and thereby separate the solids from other solids-liquid mixtures. In its apparatus aspects, the invention provides a filter of particular construction by which slack wax may be rapidly de-oiled in a continuous time-saving operation, and which requires minimum plant space and is capable of low-cost operation. According to the method of the invention, there is provided an improved practice of continuous filtration by which wax and like particles may be effectively separated from a liquid mixture containing the same.

Certain preferred details of construction together with additional advantages will be apparent and the invention itself will be best understood by reference to the following specification and to the accompanying drawings wherein:

Fig. 1 sets forth in transverse section in elevation, an illustration of one embodiment of this invention.

Fig. 2 is a cross-section through one wall of the novel de-oiler of this invention taken along lines 2—2 of Fig. 1.

Fig. 3 is an outside view of the lower portion of the cone 6 of Fig. 1.

Fig. 5 represents still another embodiment.

Figure 4:
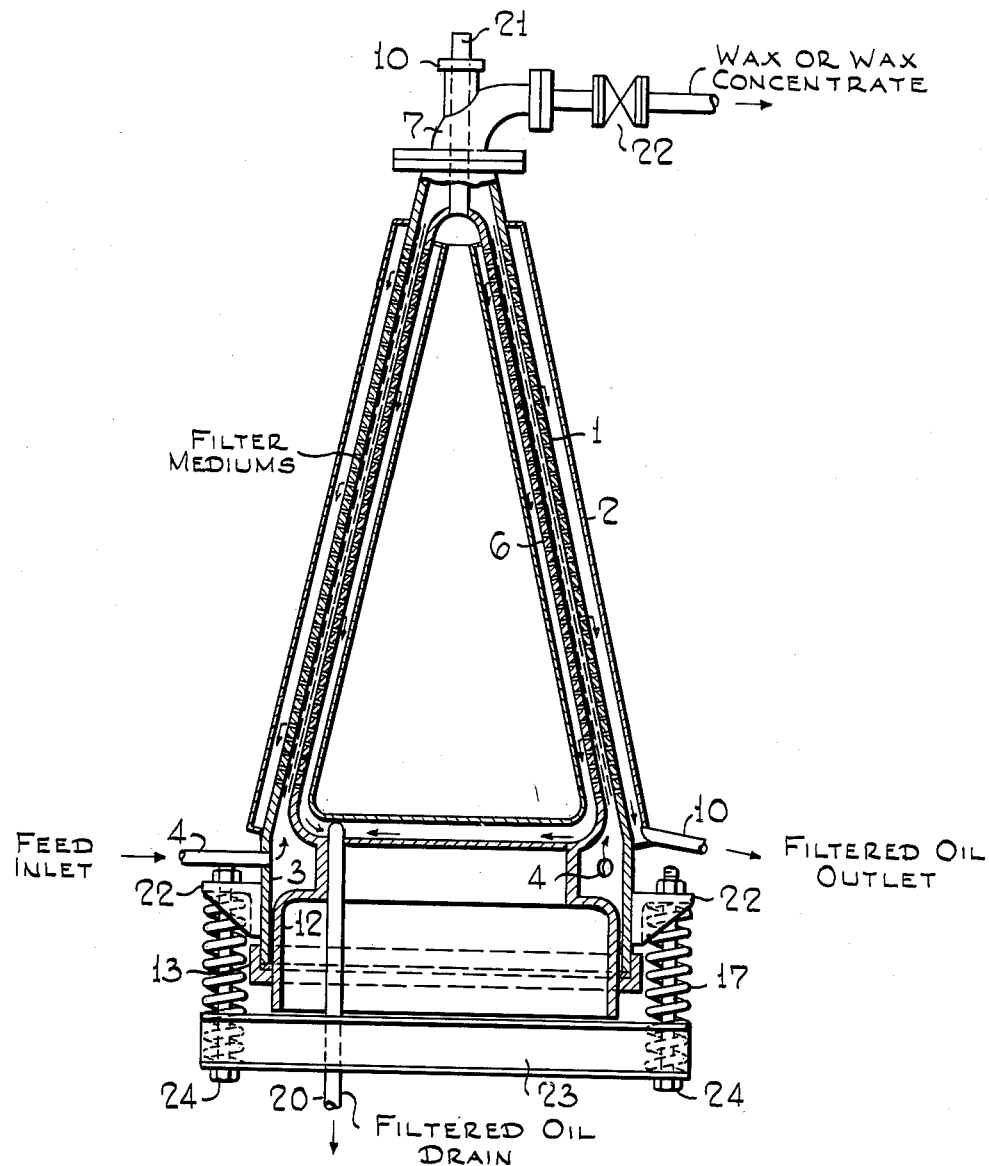
Fig. 4 represents an alternative embodiment of this invention.

Referring now to Figs. 1, 2 and 3, reference character 1 indicates a conically shaped rigid filter element 1 having an outer jacket 2 to provide an annular space for the removal of oil. The walls of the conical filter element 1 extend vertically upward from the top of the jacket 2 to form an upper extension 3. Peripherally extended from the filter just above the outside jacket 2 are outlets 4 provided with discharge regulating valves 5 for the removal of substantially oil-free wax from the filter.

Fitted into the filter element 1 is a conical plug or cone filter 6 extending almost to the bottom of the filter element 1. The space between the bottom of cone 6 and the inner walls of filter 1 terminates in an L 7 which functions as an inlet for the oil-wax mixture to be treated. The interior of plug 6 is hollow and discharges through conduit 8 extending through L 7. Conduit 8 is provided with sleeve and stuffing box 9.

Both the cone filter 6 and the outer filter element 1 have perforated walls. The outside wall of the cone filter element 6 and the inside wall of the outer filter element 1 are covered with a suitable filtering medium such as heavy canvas, Monel screen or the like. Under this filter medium may be placed coarse screen or any similar raised material to separate the filter medium from the perforated walls. This coarse material affords a suitable passage space between the filter medium and the perforated walls for the filtered oil to drain to the escape ports which are the perforations in the respective elements. Filtered oil is removed from jacket 2 through line 10.

The plug 6 is provided with a narrow neck portion 11 which is adapted to afford a manifold for the removal of the wax. Above the neck portion is an extension 12 which is tightly fitted into extension 3 of the filter. This extension may have its outer surface polished to allow motion although it is machined to a close fit. A stuffing box 13 is provided to eliminate possible leakage. Fitted into the extended section 12 are cross braces 14 into which is fitted thrust rod 15 which extends to a cross beam 16 to which heavy duty springs are fastened. These springs are secured to the supporting frame 18; these springs react against the upward thrust of the thrust rod 15 which develops when the filter is in action. Fitted to the thrust rod 15 is an adjustable stop 19 which prevents actual contact of the opposing filter surfaces of filter element 1 and cone 6. Stop 19 can be adjusted for minimum clearance between opposing filter media, as well as the maximum limit of flexible opening desired. The surface of the face of the cone 6 may also be provided with small convolutions or projections, or short length sloping scraper fins arranged in a broken spiral effect or a true spiral as shown in Fig. 3. The inner cone if desired may not be used at all as a filter medium.

In operating this embodiment of the invention a concentrated slurry of oil and wax obtained by partial filtration in a preliminary step is passed under pressure by means of a pump (not shown) into the bottom of the apparatus of Fig. 1 through L 7. This causes plug 6 (which is loosely fitted into conical filter element 1) to rise to permit passage of the slurry around the periphery of the cone. This rising of the cone 6 is resisted by the springs 17 which react against this upward thrust of cone 6. The result is that the moving wax-oil slurry is subjected to a high resilient pressure. As the concentrated slurry rises around the periphery of the cone in the narrow annular space between the two filter media it is made to roll and turn by the drag action caused by the rough surface of the filter media. This action may be intensified by the employment of the broken spiral which may be bolted to the surface of the cone through the screen and motivation employed. There is thereby developed a rolling, turning and twisting motion that kneads the wax and brings all parts of the wax mixture in close contact with the filter surface, through which the expressed oil passes into the two annular spaces from which it is drained through lines 8 or 10 or both. The cone or conical body thus literally rides or floats on a thin layer of wax the thickness of which can be regulated by the combined use of the escape pressure permitted on the wax discharge valves and the adjusted pressure on the springs. As the wax rises through the conical filter it progressively becomes lower in oil content and is finally discharged into the narrow neck section 11 (which effects a manifold 27) at the lowest oil content that can be had by kneading or at any other desired oil content.

Around the periphery of the manifold effected by the contracted section 11 are outlets 4 with control valves 5 for the discharge of the substantially oil free wax. To facilitate the wax discharge, the wax may be heated by a small coil 26 located in the manifold section which if desired allows the wax to be discharged in semi-fluid form. A more rigid control of the filtering and deoiling may be had by use of temperature control by the addition of an outer jacket in which the desired temperatures are maintained. The temperature of the jacket may be controlled throughout the filtering step or raised in the final phase of deoiling in order to soften and make the wax freely pliable to express the oil more rapidly as well as to knead out the usually undesirable low melting point wax which filters out with any remaining oil present.

The valves 5 may be completely closed and the pressure held constant and the unit then becomes a filter press. Any degree of wax concentration or any given melting point desired may be had before opening the valves again. The outside jacket 2 may be pressurized with air which forces its way across the thin wax layer, thereby forcing any oil present into cone 6 where it is drained through line 8.

Referring now to Fig. 4, there is shown an alternative embodiment in which the oil and wax mixture enters the conical deoiler at the narrow neck or manifold section at the skirt of the cone. The apparatus is essentially the same as that shown in Fig. 1–3 except that the entire assembly rests on its base and plug 6 is stationary while filter element 1 is movable. Line 4 becomes the oil inlet line (one or more may be used) and oil outlet line 10 is placed at the base end instead of the apex end of jacket 2. A new discharge line 20 is provided at the base end of cone 6 while the oil discharge line 8 of Fig. 1 now becomes a sliding guide pipe 21 to keep the cone centered. Line 7 now becomes wav discharge outlet provided with valve 22 similar to valve 8 of Fig. 1.

Springs 17 are anchored to the side of extension 3 through angle clips 22 and to cross beam 23 by bolts 24.

In operating this embodiment of the invention either a slurry or a concentrated slurry of oil and wax obtained by partial filtration in a preliminary step is passed under pressure through line 4 into the manifold section afforded by narrow neck section 11. This slurry then passes, peripherally uniformly over the skirt of the cone and forces its way up between the filter media. This pressure forces the movable conical filter element 1 to move upward to permit the passage of the slurry. This upward movement of conical filter element 1 is resisted by the springs 17 which react against this upward movement. The result is that the moving layer of wax-oil slurry is subjected to a high resilient pressure. The slurry in this embodiment is made to pass over the skirt of the cone as the greatest filter surface area is presented here to match the larger volume of oil to be filtered. As filtration progresses and the slurry moves upward between the two filter media the surface area decreases so that the kneading action as previously described is done with the smaller volumes and with the most effectual use of power. The cation developed is similar to that described in Fig. 1. As the wax rises upwardly through the conical filter it progressively becomes lower in oil content and is finally discharged through the L 7 at the lowest possible oil content where the single valve 22 regulates the thickness of the wax layer and pressure conditions desired. The upper portion of the cone or the kneading zone can be separately heated or temperature controlled to assist in filtering as well as the kneading out of the low melting point waxes. If desired the entire filter may be temperature controlled to produce wax of any given melting point.

The oil that filters into both the inner and outer jacket are combined and may be passed through a conventional revolving screen to catch any wax that may become extruded through the filter media due to excessive pressure or damage to the filter surface. This very small percent may be recycled.

It is also understood that in Fig. 1, the feed may also be fed into the narrow neck section 11 and filtered in its downward travel, the wax being discharged through L 7 and filtered oil being removed from lines 8 and 10.

Referring now to Fig. 5, there is shown still another embodiment of the invention in which the filter element is arranged in a horizontal plane and is rotated by an outside source. The apparatus is similar to Fig. 4, except that the filter element 1 and jacket 2 are supported horizontally by rollers 25, while conical element 6 fitted inside of filter 1 is supported by shaft 50 which is mounted at one end in bearing 52 and connected at its other end through thrust bearing 53 to crossbeam 23 and speed reduction gear 54. The operation of this embodiment of the invention is essentially the same as that described in connection with Fig. 4, the oil and wax entering through ports 4, the oil leaving through lines 10 and 20 and the wax through lines 55. Alternatively the wax outlet could be the same as that shown in Fig. 4.

It is, of course, obvious that the embodiment of Fig. 4 may be adapted to rotation of the cones in the same manner as in Fig. 5.

The nature of the present invention having been thus fully set forth and specific examples of the same given, what is claimed as new and useful and desired to be secured by Letters Patent is:

1. In an apparatus for deoiling petroleum wax, the combination which comprises a first hollow body with conical walls, a second hollow body with conical walls disposed within said first body whereby the substantially parallel conical walls of the two bodies form an annular space therebetween, fluid-tight stuffing box means at each end of said annular space adapted to provide sliding, longitudinal, relative movement between the bodies, the walls of at least one of said bodies being perforated for the flow of oil therethrough, a coarse filter medium covering each perforated wall and positioned within said annular space, a filter medium adapted to separate oil from wax covering each said coarse filter medium, one of said bodies being stationary and the other body being movably mounted, means for introducing an oil-containing wax under pressure within one end of said annular space whereby the movable body is displaced longitudinally away from the stationary body, resilient means connected to said movable body and yieldably resistant to the longitudinal movement of said movable body whereby the wax within said annular space is subjected to high resilient pressure, valve means for restricting and regulating the flow of deoiled wax from the opposite end of said annular space and means for removing oil which has permeated through each said perforated body.

2. An apparatus as defined in claim 1 in which the exterior surface of the conical walls of the second hollow body is covered with convolute projections.

3. An apparatus as defined in claim 2 which includes means for rotating one of the hollow bodies on its longitudinal axis.

4. An apparatus as defined in claim 1 in which the hollow bodies are vertically disposed and the inner body is the movable body.

References Cited in the file of this patent

UNITED STATES PATENTS

| | | |
|---|---|---|
| 722,632 | Rothe | Mar. 10, 1903 |
| 1,286,297 | Haertel | Dec. 3, 1918 |
| 1,354,528 | Wertenbruch | Oct. 5, 1920 |
| 1,477,986 | Thoens | Dec. 18, 1923 |

(Other references on following page)

UNITED STATES PATENTS

| Number | Name | Date |
|---|---|---|
| 1,541,163 | Westhafer et al. | June 9, 1925 |
| 1,615,734 | Alfisi | Jan. 25, 1927 |
| 1,661,614 | Kutschbach | Mar. 6, 1928 |
| 1,672,659 | Sohler | June 5, 1928 |
| 1,851,191 | Lang | Mar. 29, 1932 |
| 1,876,064 | Lang | Sept. 6, 1932 |
| 2,170,547 | Christian | Aug. 22, 1939 |
| 2,305,679 | D'Achille | Dec. 22, 1942 |
| 2,367,677 | Haines | Jan. 23, 1945 |
| 2,394,016 | Schutte et al. | Feb. 5, 1946 |

FOREIGN PATENTS

| Number | Country | Date |
|---|---|---|
| 11,163 | Great Britain | of 1911 |
| 158,844 | Great Britain | May 2, 1922 |